United States Patent
Tomita

(10) Patent No.: US 8,095,174 B2
(45) Date of Patent: Jan. 10, 2012

(54) CELLULAR PHONE, METHOD FOR CUSTOMIZING CELLULAR PHONE AND PROGRAM FOR CUSTOMIZING CELLULAR PHONE

(75) Inventor: Yuusuke Tomita, Tokyo (JP)

(73) Assignee: NEC Corporation, Tokyo (JP)

( * ) Notice: Subject to any disclaimer, the term of this patent is extended or adjusted under 35 U.S.C. 154(b) by 342 days.

(21) Appl. No.: 12/525,876

(22) PCT Filed: Jan. 23, 2008

(86) PCT No.: PCT/JP2008/050844
§ 371 (c)(1), (2), (4) Date: Aug. 5, 2009

(87) PCT Pub. No.: WO2008/096596
PCT Pub. Date: Aug. 14, 2008

(65) Prior Publication Data
US 2010/0323750 A1    Dec. 23, 2010

(30) Foreign Application Priority Data
Feb. 6, 2007  (JP) .................................. 2007-026375

(51) Int. Cl.
H04M 1/00  (2006.01)

(52) U.S. Cl. .................. 455/550.1; 455/418; 455/556.1; 707/751; 707/786

(58) Field of Classification Search .................. 455/418, 455/550.1, 556.1; 707/751, 786
See application file for complete search history.

(56) References Cited

U.S. PATENT DOCUMENTS

| | | | |
|---|---|---|---|
| 7,136,634 B1 * | 11/2006 | Rissanen et al. | 455/422.1 |
| 7,277,888 B2 * | 10/2007 | Gelormine et al. | 1/1 |
| 7,979,082 B2 * | 7/2011 | Dholakia et al. | 455/466 |
| 2004/0266453 A1 * | 12/2004 | Maanoja et al. | 455/456.1 |
| 2006/0271552 A1 * | 11/2006 | McChesney et al. | 707/10 |
| 2007/0042770 A1 * | 2/2007 | Yasui et al. | 455/428 |

FOREIGN PATENT DOCUMENTS

| | | |
|---|---|---|
| JP | 2003-044512 A | 2/2003 |
| JP | 2003-134194 A | 5/2003 |
| JP | 2004-102609 A | 4/2004 |
| JP | 2006-039615 A | 2/2006 |

OTHER PUBLICATIONS

International Search Report for PCT/JP2008/050844 mailed Feb. 26, 2008.

* cited by examiner

Primary Examiner — Nhan Le

(57) ABSTRACT

Every time a prescribe function is executed, a history use part 112 stores operation history information in an operation history DB 122. When an event occurs, an action control part 111 searches a rule DB 121, extracts an "action" corresponding to the event having occurred, and outputs the extracted action together with information indicating a situation of the occurrence of the event to the history use part 112. The history use part 112 searches he operation history DB 122 on the basis of the information indicating the situation of the occurrence of the event and extracts a corresponding "function". The history use part 112 executes an action on the basis of the "action" input from the action control part 111 and the extracted "function".

7 Claims, 3 Drawing Sheets

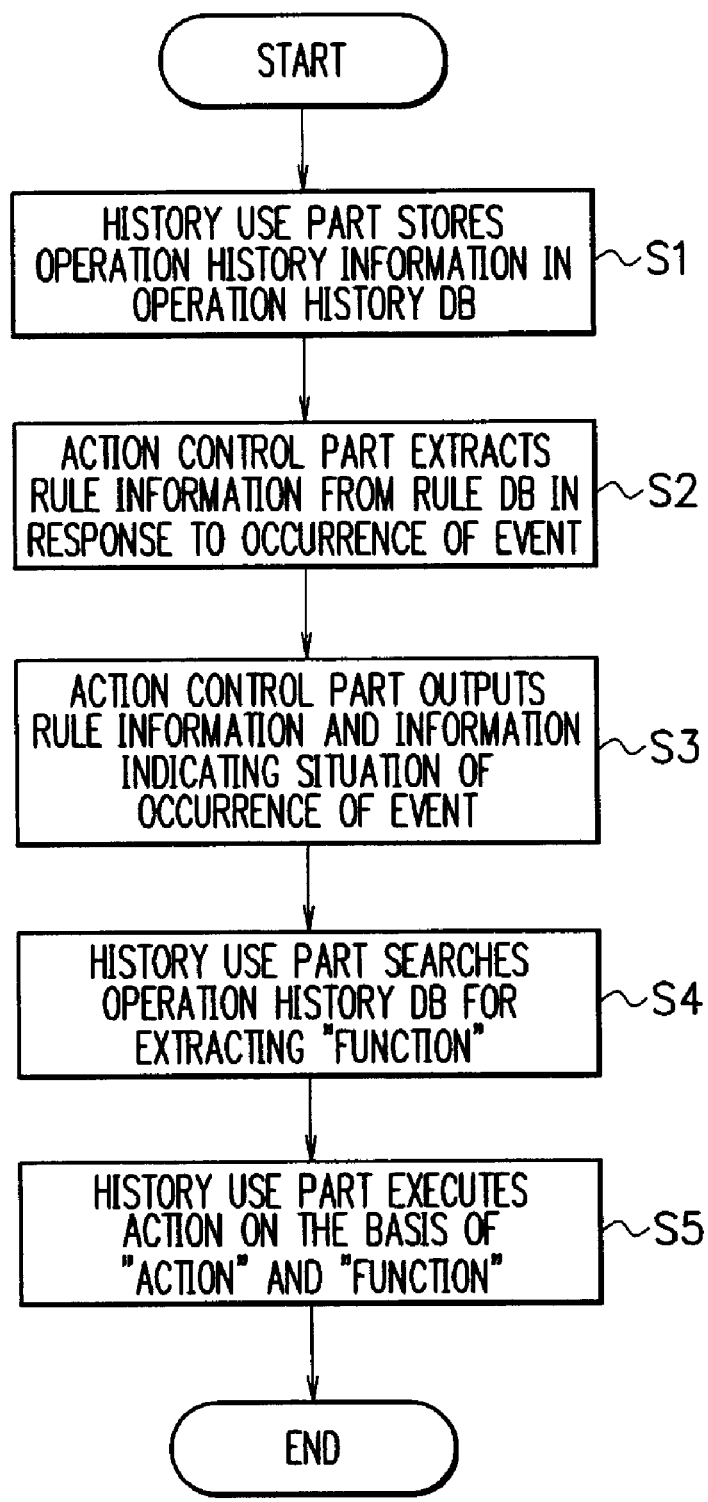

CELLULAR PHONE, METHOD FOR CUSTOMIZING CELLULAR PHONE AND PROGRAM FOR CUSTOMIZING CELLULAR PHONE

This application is the National Phase of PCT/JP2008/050844, filed Jan. 23, 2008, which is based upon and claims priority to Japanese Patent Application No. 2007-026375, filed on Feb. 6, 2007, the disclosure of which is incorporated herein in its entirety by reference.

TECHNICAL FIELD

The present invention relates to a cellular phone that can be customized for every user, a method for customizing a cellular phone and a program for customizing a cellular phone.

BACKGROUND ART

Servers and communication terminal devices that provide information to users on the basis of action histories and communication histories have been proposed (see, for example, Patent Documents 1 and 2). Patent Document 1 describes that an action area search server or an information recommendation server presents information to a user on the basis of area information of a place frequently visited by the user. Also, Patent Document 2 describes that when a user is to communicate with another person, a communication terminal device presents the user with time and communication type for him/her to easily get through as recommendation communication information by analyzing response ratios at various times with respect to various times or communication types on the basis of a communication history.

Patent Document 1: Japanese Laid-Open Patent Publication No. 2003-44512 (paragraphs 0040 through 0050)

Patent Document 2: Japanese Laid-Open Patent Publication No. 2003-134194 (paragraphs 0019, 0032 and 0034).

DISCLOSURE OF THE INVENTION

Problems to be Solved by the Invention

In the method described in Patent Document 1, however, a cellular phone should be operated in cooperation with a server, and hence, there arises a problem that the method cannot be employed when the cellular phone is off-line.

In the method described in Patent Document 2, the recommendation communication information is provided for performing the communication smoothly. In other words, this method is effective merely when a communication operation, that is, one function of the communication terminal device, is performed and cannot be employed when another operation is performed.

Furthermore, since the hierarchy of a menu used for selecting a function to be used is deep in a general cellular phone, there arises a problem that it is difficult to reach a desired function even when the function is frequently used.

Accordingly, an exemplary object of the invention is providing a cellular phone, a method for customizing a cellular phone and a program for customizing a cellular phone that can be used even the cellular phone is off-line for providing a suitable function in response to an arbitrary operation of the cellular phone.

Means for Solving the Problems

A cellular phone according to an exemplary aspect of the invention includes a rule database that stores rule information in which an event occurring in the cellular phone (such as an "operation of opening a cellular phone 10") and process data indicating an event handling process (such as a "process for displaying a recommendation short-cut icon") for recommending a prescribed function (such as "calling a telephone number of a workplace") in response to occurrence of an event are associated with each other; a history database that successively stores history information in which function data indicating an executed function (such as "calling a telephone number of a workplace") and situation data indicating a situation where the function is executed (such as a day of the week and a time) are associated with each other; an action control part that extracts corresponding process data from the rule database in response to occurrence of an event; and a history use part that extracts, from the history database, function data corresponding to situation data indicating a situation according with a situation of occurrence of the event (such as specific day of the week and time), and executes a process for recommending a function indicated by the extracted function data (such as a "process for displaying a recommendation short-cut icon for enabling calling a telephone number of a workplace") as the event handling process.

The cellular phone preferably further includes a rule database registration part capable of registering rule information in the rule database. Thus, a user can customize rule information.

The cellular phone preferably further includes an evaluation value calculating means for calculating evaluation values of a plurality of situation data stored in the history database when an event occurs, and the history use part preferably extracts function data corresponding to the situation data with a largest evaluation value from the history database. Thus, a function can be recommended on the basis of an evaluation value.

When an operation to cancel an executed event handling process is performed, the history use part preferably adds a cancel condition to history information including function data indicating a function recommended by the event handling process, and the evaluation value calculating means preferably lowers, by a prescribed amount, an evaluation value of the history information to which the cancel condition is added. Thus, a function not frequently used by a user can be made to be minimally recommended.

The rule database may store, as an action, information indicating a process for displaying, in a display part, a short-cut icon enabling execution of a prescribed function, and the history use part may display a shot-cut icon enabling execution of the extracted function in the display part and display information indicating a situation where the function is executed when the short-cut icon is selected. Thus, a reason for recommendation can be displayed.

A method for customizing a cellular phone according to an exemplary aspect of the invention includes storing, in a rule database, rule information in which an event occurring in the cellular phone and process data indicating an event handling process for recommending a prescribed function in response to occurrence of an event are associated with each other; successively storing, in a history database, history information in which function data indicating an executed function and situation data indicating a situation where the function is executed are associated with each other; extracting corresponding process data from the rule database in response to occurrence of an event; and extracting, from the history database, function data corresponding to situation data indicating a situation according with a situation of occurrence of the event and executing, as the event handling process, a process for recommending a function indicated by the extracted function data.

A program for customizing a cellular phone according to an exemplary aspect of the invention allows the cellular phone to execute processing for storing, in a rule database, rule information in which an event occurring in the cellular phone and process data indicating an event handling process for recommending a prescribed function in response to occurrence of an event are associated with each other; successively storing, in a history database, history information in which function data indicating an executed function and situation data indicating a situation where the function is executed are associated with each other; extracting corresponding process data from the rule database in response to occurrence of an event; and extracting, from the history database, function data corresponding to situation data indicating a situation according with a situation of occurrence of the event and executing, as the event handling process, a process for recommending a function indicated by the extracted function data.

EFFECTS OF THE INVENTION

According to the present invention, function data corresponding to situation data indicating a situation according with a situation of occurrence of an event is extracted from a history database, and a process for recommending a function indicated by the extracted function data is executed as an event handling process, and therefore, a function suitable to the corresponding situation can be effectively recommended.

BEST MODE FOR CARRYING OUT THE INVENTION

An exemplary embodiment of the invention will now be described with reference to the accompanying drawings. FIG. 1 is an explanatory diagram illustrating the outline of a user customizing system included in a cellular phone according to the present invention.

The user customizing system includes a user customizing engine 110. The user customizing system executes a process precedently set as an action in response to an event occurring in a cellular phone, so as to recommend a function suitable for the corresponding situation. At this point, a function suitable for the corresponding situation is a function that was performed in the same situation as that of the occurrence of the event out of functions stored as operation history information. The operation history information will be described later. Hereinafter, "performance of a function" is described as "execution of the function".

In this exemplary embodiment, a process for recommending a function suitable for the corresponding situation (namely, a function having been operated in the same situation as that of the occurrence of the event) is set as the action. For example, "display of a recommendation short-cut icon for recommending a function suitable for the corresponding situation" may be set as the action in a rule DB 121. At this point, a "recommendation short-cut icon" is an icon used for selecting execution of a recommended function. A display part of the cellular phone 10 displays a short-cut icon for activating a prescribed function in a standby screen displayed in a standby operation.

The rule DB 121 is a database for storing rule information including an "event", that is, an event occurring in the cellular phone 10, and an "action". An operation history DB 122 is a database for successively storing operation history information successively stored in executing prescribed functions.

Every time a prescribed function is executed in the cellular phone 10, a history use part 112 stores operation history information in the operation history DB 122. FIG. 1 exemplarily illustrates a case where a short-cut icon for performing a prescribed function is selected on a display part 6-1 for executing the function.

An action control part 111 searches the rule DB 121 in response to occurrence of an event, extracts an action of rule information corresponding to the "event" having occurred, and outputs the extracted action together with information indicating a situation (such as time) of occurrence of the event to the history use part 112.

The history use part 112 searches the operation history DB 122 on the basis of the information input from the action control part 111 and recommends a function suitable for the corresponding situation by executing an action for recommending the extracted function. For example, as illustrated in FIG. 1, a recommendation short-cut icon is displayed in the standby screen of the display part 6-2 as the action.

FIG. 2 is a functional block diagram illustrating an exemplary structure of the user customizing system of this invention. The user customizing system 100 illustrated in FIG. 2 includes the user customizing engine 110, the rule DB 121 and the operation history DB 122. The user customizing engine 110 includes the action control part 111, the history use part 112 and a rule DB registration part 113.

Functions of the user customizing engine 110 included in the user customizing system 100 are stored specifically in a program storage area of a memory included in the cellular phone 10. The composing elements of the user customizing engine 110, namely, the action control part 111, the history use part 112 and the rule DB registration part 113, can be realized as programs executed by a CPU included in the cellular phone 10. Also, the rule DB 121 and the operation history DB 122 used by the user customizing engine 110 are stored, for example, in a data storage area of the memory included in the cellular phone 10.

The rule DB 121 is a database for storing rule information including an "event" associated with an "action" and a "condition". A "condition" is a condition for executing the corresponding action (for example, "the action is allowed to execute if the short-cut icon was selected in the past"), and plural conditions may be registered.

The operation history DB 122 is a database for successively storing operation history information. The operation history information is information including, for example, a "function" executed in the cellular phone 10, a "date (day of the week)", a "time", a "place", "frequency in use", an "application ID" and the like. If one function was executed in plural times, the number of executions may be set as the "frequency in use".

The action control part 111 searches the rule DB 121 in response to occurrence of an event, and extracts an "action" included in rule information corresponding to the "event" having occurred. Also, the action control part 111 outputs the extracted "action" and information indicating a situation of the occurrence of the event to the history use part 112. The information indicating a situation of the occurrence of the event is information including, for example, a "date (day of the week)", a "time", a "place" and the like. The information of the "date (day of the week)", the "time", the "place" and the like included in the information indicating the situation of the occurrence of the event is the same as that included in the operation history information. It is noted that the action control part 111 outputs nothing to the history use part 112 when an "event" has occurred but a "condition" included in the corresponding rule information is not met.

The history use part 112 searches the operation history DB 122 on the basis of the situation of the occurrence of the event input from the action control part 111 and extracts a corresponding "function". For example, on the basis of the "action" input from the action control part 111 and the extracted "function", the history use part 112 extracts, from the operation history information, a "function" performed on the same "date (day of the week)" and "time" as those of the situation of the occurrence of the event. The history use part 112 executes the action. Furthermore, every time a user executes a prescribed function, the history use part 112 stores operation history information in the operation history DB 122.

The rule DB registration part 113 is used for registering rule information by the user in the rule DB 121. The user can set rule information in the rule DB 121 by using the rule DB registration part 113. Specifically, the rule information stored in the rule DB 121 is customized for every user.

FIG. 3 is a block diagram illustrating an exemplary structure of the cellular phone. As illustrated in FIG. 3, the cellular phone 10 includes an operation part 1, a control part 2 (including a CPU), a radio transmission part 3, an antenna 4, a memory 5, and a display part 6.

The control part 2 allows the display part 6 to display various menus. A user makes an instruction for displaying a telephone number or an instruction for registering a telephone number by, for example, selectively operating a telephone number display button or a telephone number registration button in a menu displayed in the display part 6. The operation part 1 inputs the instruction for displaying a telephone number or the instruction for registering a telephone number in accordance with a selective operation performed by the user. When a telephone number to be registered is input, the control part 2 makes the memory 7 store the input telephone number.

The radio transmission part 3 sends/receives radio signals to/from a base station through the antenna 4. The control part 2 controls the respective elements of the cellular phone 10 such as the radio transmission part 3 and the operation part 1. The control part 2 encodes data input from an audio circuit (not shown) or the like and outputs the encoded data to the radio transmission part 3. Also, the control part 2 decodes data received by the radio transmission part 3 and outputs the decoded data to the audio circuit or the like.

The user customizing engine 110 included in the user customizing system 100 of FIG. 2 is packaged in the cellular phone 10 as a part of the control part 2 illustrated in FIG. 3. The rule DB 121 and the operation history DB 122 illustrated in FIG. 2 are realized as a part of the memory 5 illustrated in FIG. 3.

Next, an operation performed according to the exemplary embodiment will be described with reference to FIG. 4. FIG. 4 is a flowchart illustrating an exemplary operation of the user customizing system. In the following exemplary case, it is assumed that rule information including an event of an "operation of opening a cellular phone", an action of a "process for displaying, in a standby screen, a recommendation short-cut icon enabling execution of a prescribed function" and conditions of a "date (day of the week)" and a "time" is registered in the rule DB 121. The rule information is registered in the rule DB 121 by a user with the rule DB registration part 113.

When a prescribed function is executed, the history use part 112 stores operation history information in the operation history DB 122 (step S1).

It is herein assumed that a short-cut icon #1 is displayed in a standby screen of the display part 6. At this point, the short-cut icon #1 is assumed to be an icon corresponding to a function to make a call to a workplace when selectively executed. For example, when a user of the cellular phone 10 that is an office worker goes out in the afternoon of Thursday and makes a call to his/her workplace at 1400 hours by selectively executing the short-cut icon #1, the history use part 112 stores, in the operation history DB 122, operation history information including a function of "execution of the function based on the selection of the short-cut icon #1", a date (day of the week) of "Thursday" and a time of "1400 hours".

When an event occurs, the action control part 111 searches the rule DB 121 and extracts rule information corresponding to the event having occurred (step S2). For example, when the user goes out in the afternoon of Thursday several weeks after and performs the operation of opening the cellular phone 10, the action control part 111 searches the rule DB 121 and extracts, as rule information corresponding to the event of the "operation of opening the cellular phone 10", the rule information including the action of the "process for displaying, in the standby screen, the recommendation short-cut icon for recommending the prescribed function".

Then, the action control part 111 outputs the extracted rule information and information indicating the situation of the occurrence of the event to the history use part 112 (step S3). For example, the action control part 111 outputs, as the information indicating the situation of the occurrence of the event of the "operation of opening the cellular phone 10", information including a date (day of the week) of "Thursday" and a time of "1400 hours" to the history use part 112.

The history use part 112 searches the operation history DB 122 on the basis of the information indicating the situation of the occurrence of the event input from the action control part 111 and extracts the corresponding "function" (step S4). For example, the history use part 112 selects operation history information including a date (day of the week) of "Thursday" and a time of "1400 hours" because the situation of the occurrence of the event includes the "date (day of the week)" and the "time", and extracts, as the corresponding function, "execution of the function based on the selection of the short-cut icon #1".

At this point, the history use part 112 may calculate an evaluation value of operation history information. For example, an evaluation value may be calculated as a value larger as the information more accords with the situation of the occurrence of the event, so as to extract a function with a large evaluation value. Specifically, in the case where the operation history DB 122 does not store operation history information including information of "1400 hours of Thursday" but stores operation history information including information close in terms of time to "1400 hours of Thursday", information closer in terms of time to the situation of the occurrence of the event is provided with a larger evaluation value, so as to extract a function corresponding to the largest evaluation value.

Thereafter, the history use part 112 executes an action on the basis of the "action" included in the rule information input from the action control part 111 and the extracted "function" (step S5). For example, the history use part 112 executes the "process for displaying, in the standby screen, a recommendation short-cut icon #1' enabling execution of the function based on the selection of the short-cut icon #1". Also, when the recommendation short-cut icon #1' is selected, the history use part 112 displays "Thursday, 1400 hours" as the reason for the recommendation.

In the aforementioned case, when the user would like to contact the workplace, the function to make a call to the workplace is recommended, and therefore, the user can efficiently make a call without searching for the phone number of the workplace by using an address book or a redial function.

Furthermore, in the exemplary embodiment, even when a function suitable for the situation is recommended, the function can be cancelled. For example, a function having been cancelled may be provided with a smaller evaluation value, so as not to be recommended.

In the following exemplary case, it is assumed that a short-cut icon #2 is displayed in the standby screen of the display part 6 of the cellular phone 10. At this point, the short-cut icon #2 is an icon for executing a function to read a prescribed bar code when selectively executed. For example, when a user of the cellular phone 10 that is an office worker selects the short-cut icon #2 in the evening of Friday for reading a bar code corresponding to a map of a route to a tavern in order to join a drinking, the history use part 112 stores, in the operation history DB 122, operation history information including a function of "execution of the function based on the selection of the short-cut icon #2", a data (day of the week) of "Friday" and a time of "evening".

When the user performs the operation of opening the cellular phone 10 in the evening of Friday several weeks after, the action control part 111 searches the rule DB 121 and extracts, as the rule information corresponding to the event of the "operation of opening the cellular phone 10", the rule information including the action of the "process for displaying, in the standby screen, a recommendation short-cut icon for recommending a prescribed function".

Then, the action control part 111 outputs the extracted rule information and information including a date (day of the week) of "Friday" and a time of the "evening" as the information indicating the situation of the occurrence of the event to the history use part 112.

The history use part 112 selects, for example, the operation history information including the date (day of the week) of "Friday" and the time of the "evening" since the situation of the occurrence of the event includes the "date (day of the week)" and the "time", and extracts the "execution of the function based on the selection of the short-cut icon #2" as the corresponding function. The history use part 112 executes the "process for displaying, in the standby screen, a recommendation short-cut icon #2' enabling execution of the function based on the selection of the short-cut icon #2" on the basis of the "action" included in the rule information input from the action control part 111 and the extracted "function". Also, when the recommendation short-cut icon #2' is selected, the history use part 112 displays "Friday, evening" as the reason for the recommendation.

At this point, when the user performs an operation to cancel the recommendation short-cut icon #2' because, for example, it is not frequently used, the history use part 112 stores, correspondingly to the selected operation history information, information indicating the cancel (namely, a cancel condition). It is noted that the operation to cancel is, for example, an operation to delete the recommendation short-cut icon #2' or an operation to press a key for cancellation with the recommendation short-cut icon #2' selected.

Even when operation history information including a date (day of the week) of "Friday" and a time of the "evening" is selected on the basis of the information indicating the situation of the occurrence of the event input from the action control part 111, if the selected operation history information includes a cancel condition, the history use part 112 does not execute the process based on the "action" included in the rule information input from the action control part 111. For example, the history use part 112 may calculate an evaluation value of operation history information including a cancel condition to be smaller (for example, to reduce to ⅒).

Although the action exemplarily described in the exemplary embodiment is the "process for displaying, in the standby screen, a recommendation short-cut icon enabling a prescribed function", another process may be employed as the action. For example, menu icons may be rearranged as a recommendation menu in a menu screen. Alternatively, an image taken by a camera part in the past may be displayed in the standby screen as a recommendation screen on the basis of the date and the time when it was taken.

Furthermore, although a "date (day of the week)" and a "time" are exemplarily set as the situation of the occurrence of an event, another item such as a "place" may be included. Moreover, a condition may not be set, and in this case, operation history information may be searched for with respect to all information indicating situations of the occurrences of events.

As described so far, according to the exemplary embodiment, a function suitable for a situation where a cellular phone is to be used is recommended on the basis of an operation history of the cellular phone, and therefore, the cellular phone can be customized for every user. Furthermore, a rule for recommending a function can be precedently set by a user, and hence, high suitableness can be attained. Accordingly, a user can use a frequently used function without searching for it hierarchically from a menu screen.

INDUSTRIAL APPLICABILITY

The present invention is applied for customizing a cellular phone so as to increase user-friendliness, and it is effectively applicable particularly to a multifunctional cellular phone.

BRIEF DESCRIPTION OF THE DRAWINGS

FIG. 4 is a flowchart illustrating an exemplary operation of the user customizing system.

Figure 1:
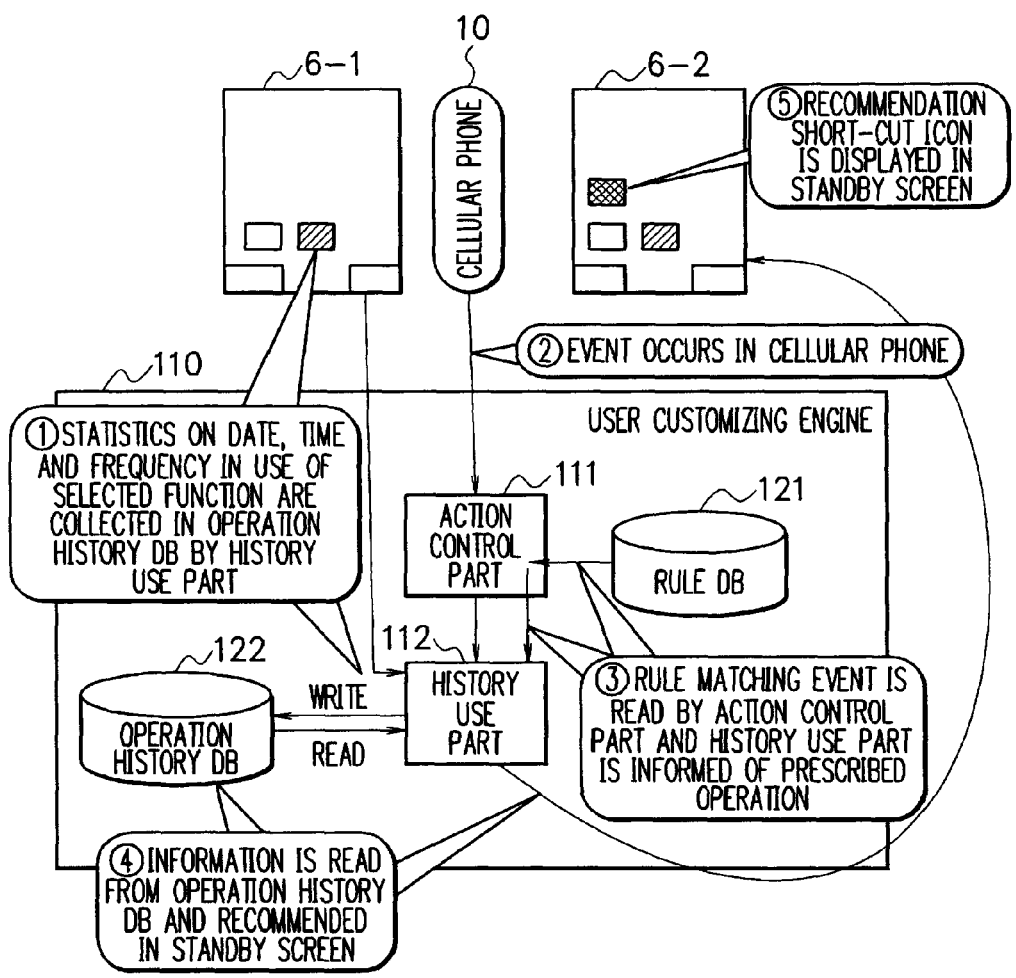
FIG. 1 is an explanatory diagram illustrating the outline of a user customizing system according to the invention.
Figure 2:
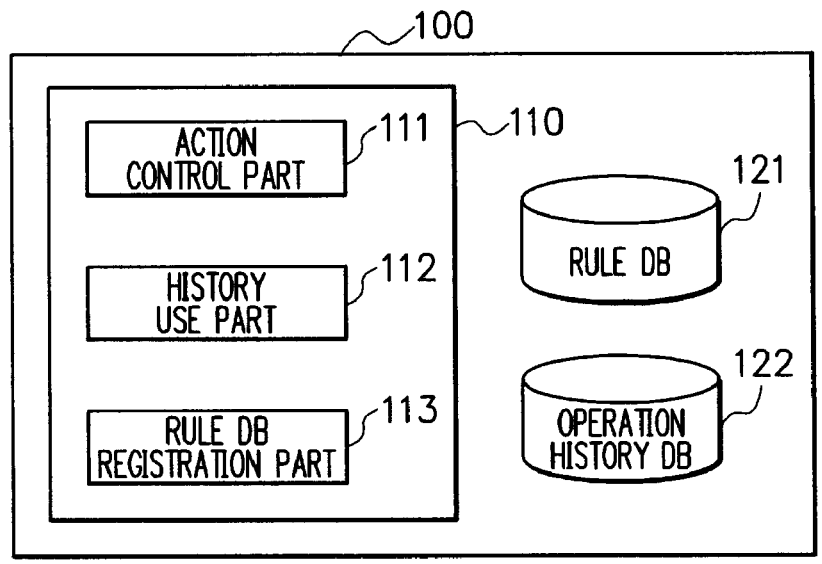
FIG. 2 is a functional block diagram illustrating an exemplary structure of the user customizing system of the invention.
Figure 3:
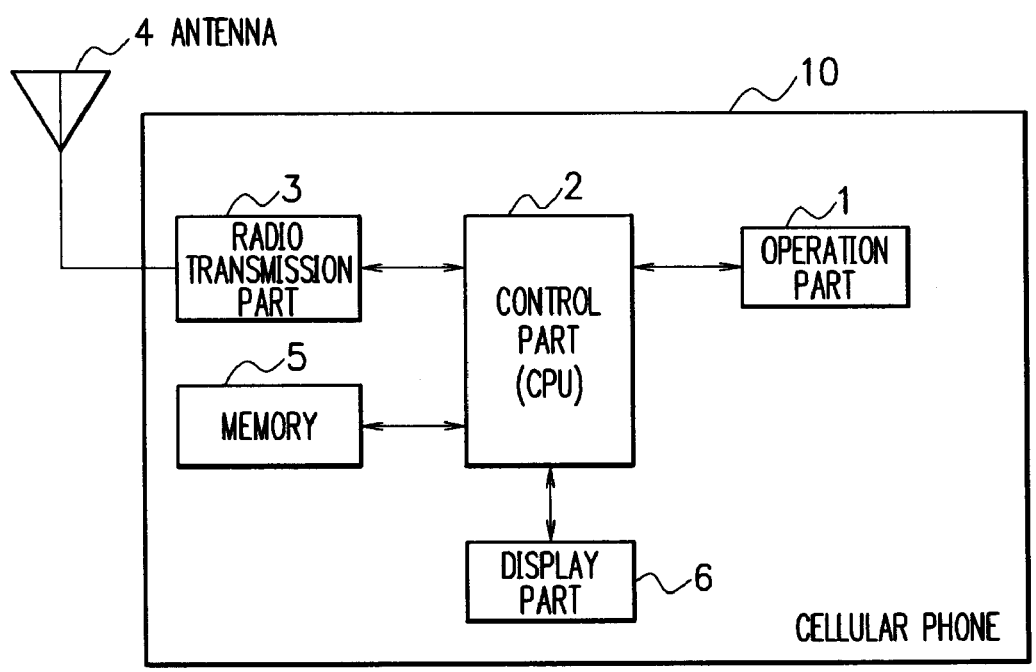
FIG. 3 is a block diagram illustrating an exemplary structure of a cellular phone.

DESCRIPTION OF REFERENCE NUMERALS 6-1, 2 display part
10 cellular phone
110 customizing engine
111 action control part
112 history use part
121 rule DB
122 operation history DB

What is claimed:
1. A cellular phone comprising:
a rule database that stores rule information in which an event occurring in the cellular phone and process data indicating an event handling process for recommending a prescribed function in response to occurrence of an event are associated with each other;
a history database that successively stores history information in which function data indicating an executed function and situation data indicating a situation where the function is executed are associated with each other;

an action control part that extracts corresponding process data from the rule database in response to occurrence of an event; and a history use part that extracts, from the history database, function data corresponding to situation data indicating a situation according with a situation of occurrence of the event, and executes a process for recommending a function indicated by the extracted function data as the event handling process.

2. The cellular phone according to claim 1, further comprising a rule database registration part capable of registering rule information in the rule database.

3. The cellular phone according to claim 1 further comprising an evaluation value calculating part for calculating evaluation values of a plurality of situation data stored in the history database when an event occurs, wherein the history use part extracts function data corresponding to the situation data with a largest evaluation value from the history database.

4. The cellular phone according to claim 3, wherein when an operation to cancel an executed event handling process is performed, the history use part adds a cancel condition to history information including function data indicating a function recommended by the event handling process, and the evaluation value calculating part lowers, by a prescribed amount, an evaluation value of the history information to which the cancel condition is added.

5. The cellular phone according to claim 1, wherein the rule database stores, as an action, information indicating a process for displaying, in a display part, a short-cut icon enabling execution of a prescribed function, and the history use part displays a shot-cut icon enabling execution of the extracted function in the display part and displays information indicating a situation where the function is executed when the short-cut icon is selected.

6. A method for customizing a cellular phone, comprising:

storing, in a rule database, rule information in which an event occurring in the cellular phone and process data indicating an event handling process for recommending a prescribed function in response to occurrence of an event are associated with each other;

successively storing, in a history database, history information in which function data indicating an executed function and situation data indicating a situation where the function is executed are associated with each other;

extracting corresponding process data from the rule database in response to occurrence of an event; and extracting, from the history database, function data corresponding to situation data indicating a situation according with a situation of occurrence of the event and executing, as the event handling process, a process for recommending a function indicated by the extracted function data.

7. A non-transitory storing medium for storing a program for customizing a cellular phone for allowing the cellular phone to execute processing for:

storing, in a rule database, rule information in which an event occurring in the cellular phone and process data indicating an event handling process for recommending a prescribed function in response to occurrence of an event are associated with each other;

successively storing, in a history database, history information in which function data indicating an executed function and situation data indicating a situation where the function is executed are associated with each other;

extracting corresponding process data from the rule database in response to occurrence of an event; and extracting, from the history database, function data corresponding to situation data indicating a situation according with a situation of occurrence of the event and executing, as the event handling process, a process for recommending a function indicated by the extracted function data.

* * * * *